Dec. 8, 1970 E. SALZER 3,546,692

COMBINED OPTICAL AND ACOUSTICAL BLOWN FUSE INDICATOR

Filed Dec. 16, 1968 3 Sheets-Sheet 1

INVENTOR:

Erwin Salzer

Dec. 8, 1970 E. SALZER 3,546,692

COMBINED OPTICAL AND ACOUSTICAL BLOWN FUSE INDICATOR

Filed Dec. 16, 1968 3 Sheets-Sheet 2

INVENTOR:

Erwin Salzer

INVENTOR:
Erwin Salzer

United States Patent Office 3,546,692
Patented Dec. 8, 1970

3,546,692

COMBINED OPTICAL AND ACOUSTICAL BLOWN FUSE INDICATOR

Erwin Salzer, Waban, Mass., assignor to The Chase-Shawmut Company, Newburyport, Mass.

Filed Dec. 16, 1968, Ser. No. 784,071
Int. Cl. G08b 21/00
U.S. Cl. 340—250 5 Claims

ABSTRACT OF THE DISCLOSURE

An electric polyphase system, or other electric circuitry including a plurality of conductors for carrying current, is provided with an electric fuse in each of its phases, or in each of its conductors for carrying current, respectively. The system further includes a plurality of glow-lamp blown fuse indicators each operatively related to a fuse to pinpoint any particular fuse that may have blown. In addition the system includes an acoustic blown fuse indicator for calling the attention of an attendant whose vision might not be directed to the glow-lamp blown fuse indicators at the time one or more fuses blow to the fact that a fault occurred, resulting in blowing of one or more fuses. Each glow-lamp blown fuse indicator circuit is provided with coupling means insulatingly interposed between the same and a solid state switching device controlling the acoustic blown fuse indicator for indicating operation of the latter by a pulse occurring concomitant with firing of any glow-lamp blown fuse indicator. Thus each glow-lamp blown fuse indicator performs the dual function of indicating blowing of a fuse, and of initiating, by being fired, the operation of the acoustic blown fuse indicator.

SUMMARY OF INVENTION

A system embodying this invention includes a plurality of conductors for carrying electric currents, and a plurality of electric fuses each arranged in one of said plurality of conductors. It further includes a plurality of glow-lamp indicator circuits each connected across one of said plurality of fuses, each having a glow-lamp fired in response to a predetermined voltage prevailing across one of said plurality of fuses, and an electroacoustic signalling device including an energizing circuit therefor. Said energizing circuit is controlled by a solid state switching device adapted to be activated by an external source of energy. The system further includes a plurality of coupling means each insulatingly interposed between one of said plurality of glow-lamp indicator circuits and said switching device to activate said switching device in response to firing of said glow-lamp in any of said plurality of glow-lamp indicator circuits.

DESCRIPTION OF PREFERRED EMBODIMENTS

Figure 1:
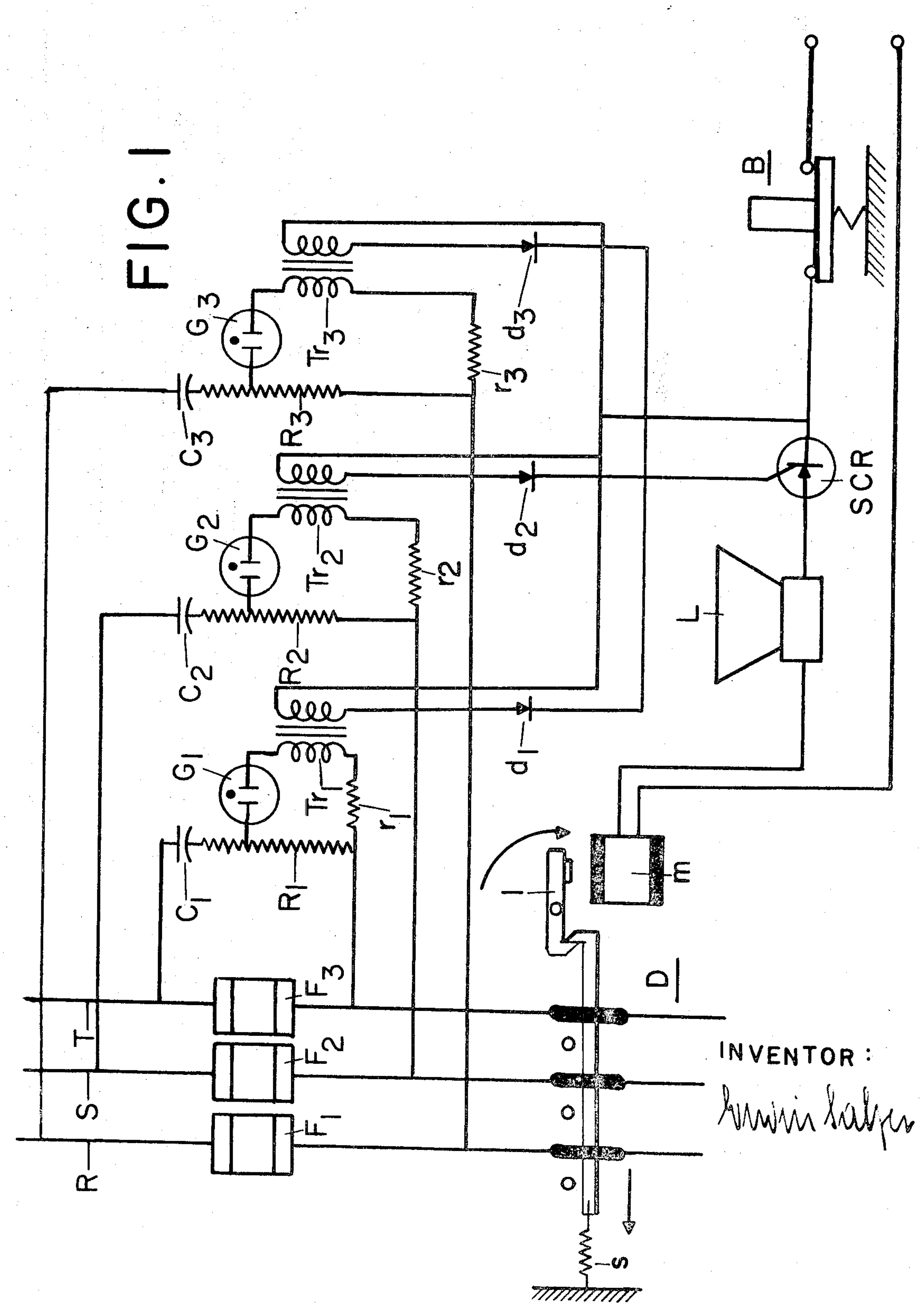
FIG. 1 is a circuit diagram of a system embodying this invention wherein the aforementioned coupling means is formed by a group of transformers.

Referring now to FIG. 1 reference characters R, S, T have been applied to indicate three conductors the upper ends of which are conductively connected to three buses (not shown). The lower ends of conductors R, S, T are connected by a disconnect switch D to a load, e.g. an electric motor or the like device (not shown). Disconnect switch D is biased by spring *s* to the open position thereof and is normally held in its closed position by a latch mechanism 1. The latter may be tripped by electromagnet *m*, thus causing opening of disconnect D under the action of spring *s*. A straight arrow indicates the opening direction of disconnect D and a circular arrow indicates the unlatching direction of latch mechanism 1.

Each line or conductor R, S and T of what may be a polyphase circuit R, S, T includes a fuse $F_1$, $F_2$, $F_3$. ach fuse $F_1$, $F_2$, $F_3$ is shunted by a shunt circuit. Each of the aforementioned shunt circuits includes a capacitor $C_1$, $C_2$, $C_3$ and a potentiometer $R_1$, $R_2$, $R_3$. Glow-lamps $G_1$, $G_2$, $G_3$ are conductively connected to potentiometers $R_1$, $R_2$, $R_3$. Reference characters $Tr_1$, $Tr_2$, $Tr_3$ have been applied to indicate three signalling insulating transformers. The primary circuits of these transformers include, in addition to the primary windings of transformers $Tr_1$, $Tr_2$ and $Tr_3$, glow-lamps $G_1$, $G_2$, $G_3$ and current-limiting resistors $r_1$, $r_2$, $r_3$. The secondary circuits of transformers $Tr_1$, $Tr_2$, $Tr_3$ include, in addition to the secondary windings thereof, diodes $d_1$, $d_2$, $d_3$, thus forming a three-phase half wave rectifier. This three-phase rectifier energizes the gate circuit of a static solid state switch or thyristor SCR whose anode-cathode circuit is energized by an A-C circuit having a circuit voltage in excess of 100 volt. Push button switch B spring biased to its closed position, tripping electro-magnet *m* and electromagnetic horn L are serially arranged in the aforementioned A-C circuit.

Upon blowing of any of fuses $F_1$, $F_2$, $F_3$ the voltage across the respective fuse, or fuses, rises from a few millivolts to line voltage. This causes firing of the particular glow-lamp $G_1$, $G_2$, $G_3$ associated with the fuse $F_1$, $F_2$, $F_3$ that has blown. Thus a three-phase short-circuit causes blowing of all three fuses $F_1$, $F_2$, $F_3$, and firing of all three glow-lamps $G_1$, $G_2$, $G_3$. Each glow lamp $G_1$, $G_2$, $G_3$ has two functions, i.e. it is a blown fuse indicator, and it is a circuit component for triggering thyristor SCR. This is achieved by the intermediary of insulating transformers $Tr_1$, $Tr_2$, $Tr_3$ and diodes $d_1$, $d_2$, $d_3$. The former insulate the circuits of glow-lamps $G_1$, $G_2$, $G_3$ from the gate circuit of a static semiconductor switch or thyristor SCR and transmit energy from the former to the latter. Diodes $d_1$, $d_2$, $d_3$ preclude bucking of the current across one of the secondary windings of transformers $Tr_1$, $Tr_2$, $Tr_3$ by the voltage across another of the secondary windings of transformers $Tr_1$, $Tr_2$, $Tr_3$. Triggering of thyristor SCR by any one or all glow-lamps $G_1$, $G_2$, $G_3$ and transformers $Tr_1$, $Tr_2$, $Tr_3$ results in tripping of disconnect switch D by tripping magnet *m*, and energization of loudspeaker, or alarm horn L, thus calling attention to the fact that the polyphase circuit R, S, T is, or the three circuits R, S, T are, faulted. The condition of glow-lamps $G_1$, $G_2$, $G_3$ indicates at sight thereof which phase or circuit is interrupted. It is apparent that disconnect D can open only upon blowing of some of the fuses $F_1$, $F_2$, $F_3$. Disconnect D effectively precludes single-phasing. Since disconnect D may be tripped in response to blowing of less than all fuses $F_1$, $F_2$, $F_3$, it may be called upon to interrupt load currents and must be able to perform this duty. Thyristor SCR, acoustic signalling device L and tripping magnet *m* are deenergized by depressing switch B.

Assuming fuses $F_1$, $F_2$, $F_3$ to blow simultaneously, and diodes $d_1$, $d_2$, $d_3$ not to be included in the secondary circuits of transformers $Tr_1$, $Tr_2$, $Tr_3$. Under such conditions the gate current of thyristor SCR might be reduced virtually to zero, thus precluding energization of horn L and tripping magnet *m*. Since diodes $d_1$, $d_2$, $d_3$ preclude any reverse bias the thyristor SCR, and preclude reduction of its trigger current below the level required for triggering thyristor SCR, their presence in the circuit of FIG. 1 is highly desirable.

Figures 2, 2A:
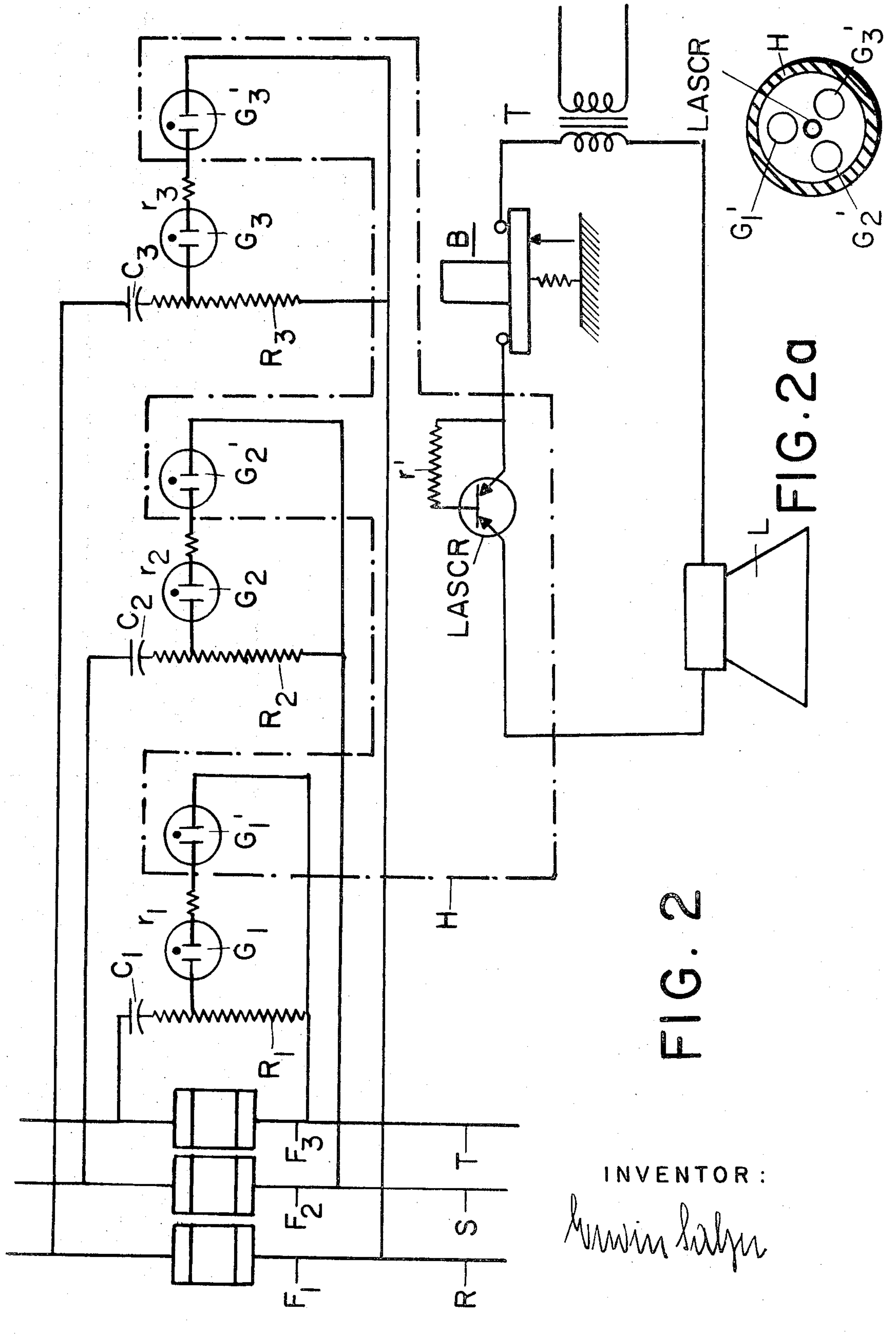
FIG. 2 is a circuit diagram of a system similar to that shown in FIG. 1 wherein the aforementioned switching device is a light-activated thyristor.
FIG. 2*a* shows diagrammatically the spatial arrangement of the light-activated thyristor of FIG. 2 and that of three auxiliary sources of radiant energy in a common housing.
Figure 3:
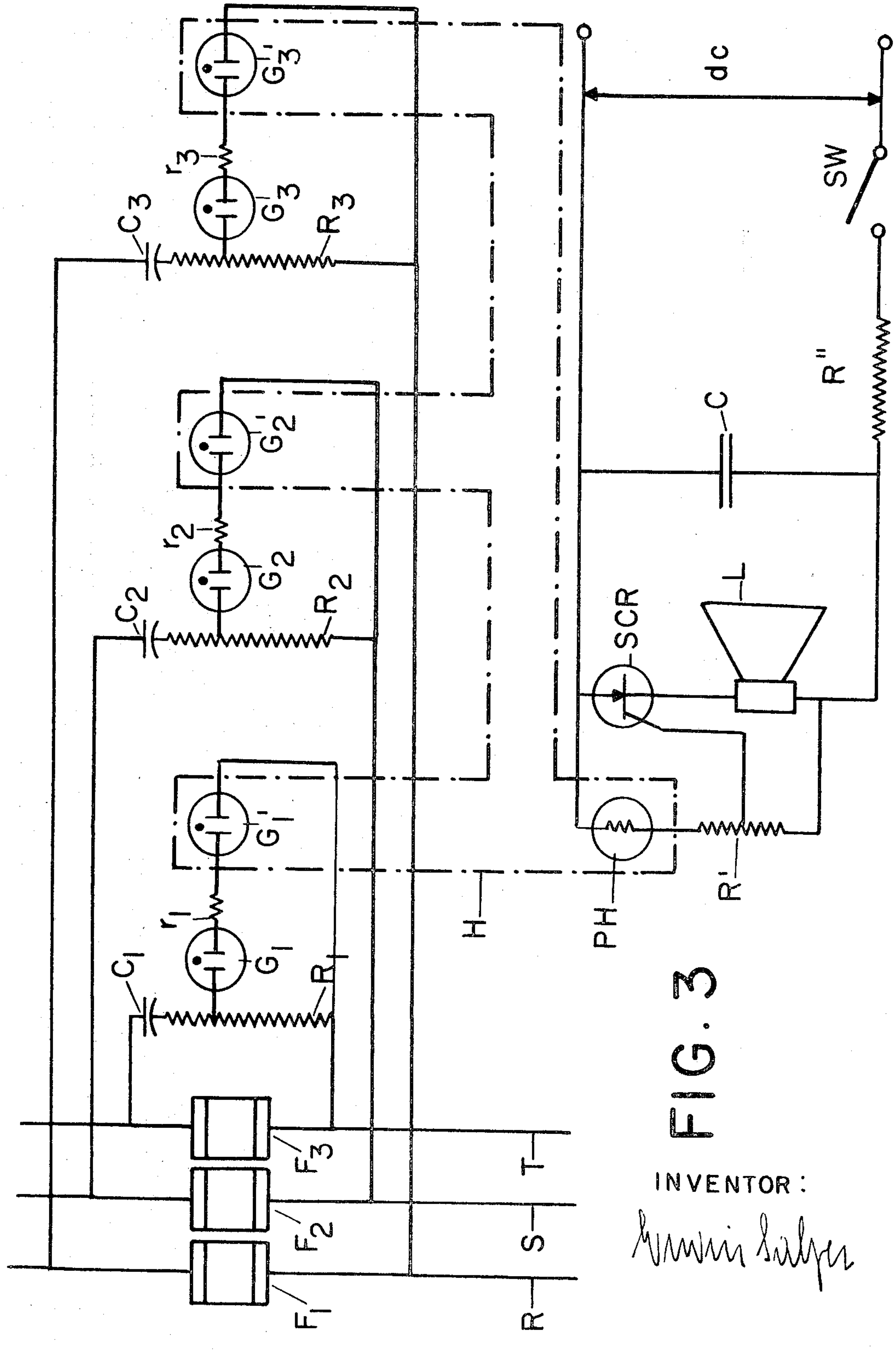
FIG. 3 is a circuit diagram of a system similar to that shown in FIGS. 1 and 2 wherein triggering of a thyristor is controlled by a photoconductor exposed to the radiation emanating from three auxiliary sources of radiant energy.

Upon tripping of disconnect switch D the voltage of the lower terminals of fuses $F_1$, $F_2$, $F_3$ is floating; but the difference of potential between the line voltage prevailing at the upper terminals of fuses $F_1$, $F_2$, $F_3$ and that floating voltage maintains glow-lamps $G_1$, $G_2$, $G_3$ in the conductive condition thereof. If disconnect switch D is omitted (as in FIGS. 2 and 3) and the load is either Δ connected or Y connected, the full voltage between phases, or the phase voltage, respectively, prevails across each fuse $F_1$, $F_2$, $F_3$ upon blowing thereof. FIGS. 2 and 3 require description only to the extent that the systems shown therein differ from that shown in FIG. 1 and described in connection with this figure.

The same reference characters have been applied in FIGS. 1, 2 and 3 to indicate like parts.

FIGS. 2 and 3 differ from FIG. 1 in that the disconnect switch D of the latter figure has been deleted in the former figures.

Referring now more specifically to FIG. 2, the three transformers $Tr_1$, $Tr_2$, $Tr_3$ of FIG. 1 have been replaced in FIG. 2 by auxiliary light sources, or sources of radiant energy $G_1'$, $G_2'$, $G_3'$, and by the light activated thyristor LASCR. Each of glow-lamps $G_1'$, $G_2'$, $G_3'$ is serially connected with one of glow-lamps $G_1$, $G_2$, $G_3$ to form three strings of glow-lamps $G_1$, $G_1'$; $G_2$, $G_2'$; $G_3$, $G_3'$. Glow-lamps $G_1'$, $G_2'$, $G_3'$ are arranged in a common housing indicated diagrammatically by the dash-and-dot line H, and thus segregated from glow-lamps $G_1$, $G_2$, $G_3$. The light activated thyristor LASCR is arranged inside of housing H and energized from a 120 volt A-C line by the intermediary of step-down transformer T. Horn L, or another electroacoustic signalling device, is arranged in series with light-activated thyristor LASCR. Each of glow-lamps $G_1'$, $G_2'$, $G_3'$ is arranged in such a way as to illuminate upon its being fired light-activated thyristor LASCR. Housing H precludes light activation of thyristor LASCR by light sources other than glow-lamps $G_1'$, $G_2'$, $G_3'$. Resistor $r'$ in FIG. 2 conductively connects the anode of light-activated thyristor LASCR with the gate terminal thereof, thus establishing the gate circuit necessary for the operation of light-activated thyristor LASCR.

Glow-lamp $G_1'$ and thyristor LASCR operate as a coupling means and transducer, converting electric energy of the circuit shunting fuse $F_1$ into light, or radiant energy, to activate thyristor LASCR. Similarly components $G_2'$ and LASCR may be considered to be a second coupling means and components $G_3'$ and LASCR to be a third coupling means. Thus components $G_1'$, $G_2'$, $G_3'$, LASCR of FIG. 2 perform, in essence, the same function as transformers $Tr_1$, $Tr_2$, $Tr_3$ of FIG. 1, namely to isolate pairs of circuits from each other and to transmit energy from one of each pair of circuits to the other.

Glow-lamps $G_1$, $G_2$, $G_3$ are arranged to be exposed to view since it is their function to indicate which of fuses $F_1$, $F_2$, $F_3$ has blown, and which of fuses $F_1$, $F_2$, $F_3$ is intact. Glow-lamps $G_1'$, $G_2'$, $G_3'$ must be enclosed with thyristor LASCR in common housing H, precluding activation of thyristor LASCR by any light source or source of radiant energy other than glow-lamps $G_1'$, $G_2'$, $G_3'$ and, therefore, glow-lamps $G_1'$, $G_2'$, $G_3'$ cannot be exposed to view.

As shown in FIG. 2*a* the housing H may be tubular, light-activated thyristor LASCR may be arranged in its center and auxiliary sources of radiant energy or glow-lamps $G_1'$, $G_2'$, $G_3'$ may be arranged circularly around thyristor LASCR and angularly displaced 120 deg. to activate thyristor LASCR substantially by the same flux of radiant energy.

The system of FIG. 3 differs most significantly from that of FIG. 2 by substitution of a normal thyristor SCR having a photoconductive element PH in its gate circuit for the light-activated thyristor LASCR of FIG. 2.

Referring now specifically to FIG. 3, a small loudspeaker L is arranged in the anode-cathode circuit of thyristor SCR. The latter forms part of a relaxation oscillator circuit including cpacitor C charged through resistor R″ by a DC supply. Capacitor C is discharged through thyristor SCR and loudspeaker L when the former is being triggered. This produces a sound or click in loudspeaker L. Thyristor SCR is fired by a gate current derived from potentiometer R′ when the former reaches a predetermined value. This value depends, inter alia, upon the setting of potentiometer R′. Potentiometer R′ is normally set below the threshold for firing thyristor SCR. Blowing of any of fuses $F_1$, $F_2$, $F_3$ causes firing of the corresponding string of glow-lamps $G_1$, $G_1'$; $G_2$, $G_2'$; $G_3$, $G_3'$. This establishes by means of glow-lamps $G_1$, $G_2$, $G_3$ one or more optical signals indicating which of fuses $F_1$, $F_2$, $F_3$ has blown. In addition thereto, the irradiation of cadmium sulfide photoconductor PH in series with potentiometer R″ reduces its resistance, and thus increases the voltage of the gate circuit of thyristor SCR above threshold. This, in turn, establishes an acoustic warning signal indicating that one or more of fuses $F_1$, $F_2$, $F_3$ have blown.

It will be noted that none of the systems which have been shown and described includes amplifier means for amplifying the trigger pulses resulting from firing of the indicator glow-lamps. It is desirable in the interest of simplicity and cost effectiveness to dispense with such amplifier means, though their presence is not incompatible with this invention.

It will be understood that I have illustrated and described herein several preferred embodiments of the invention, and that various alterations may be made therein without departing from the spirit and scope of the appended claims.

I claim as my invention:

1. A combined optical and acoustic blown fuse indicator system including (a) a plurality of conductors for carrying electric currents;

(b) a plurality of electric fuses each arranged in one of said plurality of conductors;

(c) a plurality of glow-lamp indicator circuits each connected across one of said plurality of fuses and each having a glow-lamp fired in response to a predetermined voltage prevailing across one of said plurality of fuses;

(d) an electroacoustic signalling device including an energizing circuit therefor;

(e) a solid state switching device controlling said energizing circuit and adapted to be activated by an external source of energy; and (f) a plurality of coupling means each insulatingly interposed between one of said glow-lamp indicator circuits and said switching device to activate said switching device in response to firing of said glow-lamp in any of said plurality of glow-lamp indicator circuits.

2. A combined optical and acoustic blown fuse indicator system as specified in claim 1 wherein each of said plurality of glow-lamp indicator circuits includes the primary winding of one of a plurality of transformers and wherein said solid state switching device is a thyristor having a gate circuit energized by the rectified output of the secondary winding of each of said plurality of transformers.

3. A combined optical and acoustic blown fuse indicator system as specified in claim 1 including (a) a plurality of auxiliary sources of radiant energy each included in one of said plurality of glow-lamp indicator circuits and each emitting radiant energy in response to firing of said glow-lamp in one of said plurality of glow-lamp indicator circuits;
(b) a common housing enclosing said plurality of auxiliary sources of radiant energy and segregating said plurality of auxiliary sources of radiant energy from said glow-lamp in each of said plurality of glow-lamp indicator circuits; and
(c) a thyristor activated by radiant energy inside said common housing arranged to be activated by radiant energy emitted by any of said plurality of auxiliary sources of radiant energy.

4. A combined optical and acoustic blown fuse indicator system as specified in claim 1 including
(a) a plurality of auxiliary sources of radiant energy each in one of said plurality of glow-lamp indicator circuits and each emitting light in response to firing of said glow-lamp in one of said glow-lamp indicator circuits;
(b) a common housing enclosing said plurality of auxiliary sources of radiant energy and segregating said plurality of sources of radiant energy from said glow-lamp in each of said plurality of glow-lamp indicator circuits;
(c) a photoconductor inside said common housing exposed to radiation emitted from any of said plurality of sources of radiant energy; and
(d) a thyristor controlling said energizing circuit of said electroacoustic signalling device, said thyristor having a gate circuit including said photoconductor.

5. In combination (a) a plurality of electric circuits;
(b) a plurality of electric fuses each arranged in one of said plurality of circuits;
(c) a plurality of shunt-circuits each arranged across one of said plurality of fuses, each of said shunt circuits including a glow-lamp firing in response to a predetermined voltage across one of said plurality of fuses;
(d) an electroacoustic signalling device under the control of a static semiconductor switch; and
(e) a plurality of coupling devices each energized by electric energy in one of said plurality of shunt circuits, each of said plurality of coupling devices including non-electroconductive means for transferring energy from one of said plurality of shunt circuits to said semiconductor switch to activate said semiconductor switch to energize said electroacoustic signalling device.

References Cited

UNITED STATES PATENTS

| | | | |
|---|---|---|---|
| 2,317,030 | 4/1943 | Colvin | 340—250 |
| 2,464,848 | 3/1949 | Collins | 340—250 |

THOMAS B. HABECKER, Primary Examiner

D. MYER, Assistant Examiner

U.S. Cl. X.R.

250—214; 317—40, 46; 340—228, 412